(12) United States Patent
Rouse

(10) Patent No.: US 10,998,745 B2
(45) Date of Patent: May 4, 2021

(54) PORTABLE BLOWER FAN ASSEMBLY

(71) Applicant: Michael Rouse, Baytown, TX (US)

(72) Inventor: Michael Rouse, Baytown, TX (US)

(*) Notice: Subject to any disclaimer, the term of this patent is extended or adjusted under 35 U.S.C. 154(b) by 210 days.

(21) Appl. No.: 15/599,820

(22) Filed: May 19, 2017

(65) Prior Publication Data
US 2018/0335040 A1 Nov. 22, 2018

(51) Int. Cl.
| H02J 7/00 | (2006.01) |
| A63B 57/00 | (2015.01) |
| F04D 25/06 | (2006.01) |
| F04D 29/60 | (2006.01) |
| F04D 25/08 | (2006.01) |

(52) U.S. Cl.
CPC ............ *H02J 7/0068* (2013.01); *A63B 57/00* (2013.01); *F04D 25/0673* (2013.01); *F04D 25/084* (2013.01); *F04D 29/601* (2013.01)

(58) Field of Classification Search
CPC .. F04D 25/0673; F04D 25/084; F04D 29/601; H02J 7/0068; A63B 57/00
See application file for complete search history.

(56) References Cited

U.S. PATENT DOCUMENTS

| 6,409,475 | B1* | 6/2002 | Ho | F04D 25/06 248/314 |
| 6,886,270 | B2* | 5/2005 | Gilmer | F04D 29/601 180/53.1 |
| 6,915,996 | B2* | 7/2005 | Lin | F16C 11/06 248/288.31 |
| 8,674,211 | B1* | 3/2014 | Palmer | H02S 30/20 136/244 |
| 9,175,697 | B1* | 11/2015 | Kadau | F04D 25/10 |
| 2009/0071480 | A1* | 3/2009 | Adams | A61M 16/0066 128/204.18 |
| 2010/0290907 | A1* | 11/2010 | Wark | F04D 25/084 416/63 |
| 2013/0081842 | A1* | 4/2013 | Rozmarynowski | B25F 5/00 173/217 |

* cited by examiner

*Primary Examiner* — Charles G Freay
(74) *Attorney, Agent, or Firm* — Joycelyn S. Brown

(57) ABSTRACT

A portably blower fan assembly is provided that may be configured to be removably attached to a golf cart. In some embodiments, the present invention may provide for a battery pack element configured to power a blower fan, which in some embodiments may be a squirrel cage blower fan. The present invention may also provide for one or more clamps configured to removably secure the blower fan in position along a golf cart's frame.

9 Claims, 10 Drawing Sheets

PORTABLE BLOWER FAN ASSEMBLY

CROSS-REFERENCE TO RELATED APPLICATION

Not applicable.

TECHNICAL FIELD

The present invention relates generally to the field of fans and more specifically relates to a blower fan assembly configured to removably attach to a golf cart.

BACKGROUND

In order to complete a round of golf, golfers spend a considerable amount of time on the course. Much, if not most, of that time is spent either in or nearby a golf cart. But when they are not driving the golf cart, many of these golfers don't have any air circulating to keep cool. Because the heat can rise to uncomfortable temperatures, many older players aren't always able to finish their rounds. Some golfers can even suffer from heat related illness in such conditions. Many golfers therefore turn to portable fans. However, these fans are often inadequate. Besides the fact that they do not circulate enough air for the golf course environment, most portable fans are limited by a configuration wherein the batteries are inserted into the frame of the fan itself. As such, not only do these fans inevitably run out of battery power, they are also limited by the size and type of power they can receive and use. These golfers would therefore benefit from a portable fan powered by its own separate external power source that can travel the golf course with them. As such, a need exists for an advanced portable blower fan assembly that can removably attach to a golf cart.

Various attempts to solve this problem have been made. One such attempt can be seen with respect to U.S. Patent Application Publication No. 2008/0152482, incorporated by reference in its entirety herein, which generally discloses a portable solar-powered fan. While this disclosure does provide for a fan configured to be portable and of use in the outdoors, it fails to provide for a strong enough fan to properly cool golfers in a golf cart, and is also not adequately configured for mounting to a golf cart.

Another attempt can be seen with respect to U.S. Pat. No. 6,435,293, incorporated by reference in its entirety herein, which generally discloses a golf cart having built-in air conditioning. While this disclosure does provide for a golf cart having cooling properties, this disclosure is a large, expensive, and permanently-mounted solution that is an impractical purchase for the average golfer. This disclosure would also be very difficult to install and uninstall for a round of golf.

Yet another attempt can be seen with respect to U.S. Pat. No. 6,112,538, incorporated by reference in its entirety herein, which generally discloses a portable misting device configured for use in a golf cart. While this disclosure does provide for the flexibility of a portable cooling device on a golf cart, many golfers may not want to get wet. Additionally, this disclosure is likely to run out of water during a round of golf, and therefore has limited usefulness.

Various attempts have been made to solve the problems which may be found in the related art but have thus far been unsuccessful. A need exists for a new blower fan assembly that is configured to removably attach to a golf cart to avoid the above-mentioned problems.

SUMMARY OF THE INVENTION

It is to be understood that in the present disclosure, all embodiments are provided as illustrative and non-limiting representatives of many possible embodiments. In addition, the terms "is," "can," "will," and the like are herein used as synonyms for and interchangeable with terms such as "may," "may provide for," and "it is contemplated that the present invention may" and so forth.

The present invention relates to a blower fan assembly configured to removably attach to a golf cart that overcomes the deficiencies of the prior art. It is contemplated that the present invention may provide an easily-installed and effective fan.

For purposes of summarizing, certain aspects, advantages, and novel features of the present invention are provided herein. It is to be understood that not all such aspects, advantages, or novel features may be provided in any one particular embodiment. Thus, the disclosed subject matter may be embodied or carried out in a manner that achieves or optimizes one aspect, advantage, or novel feature or group of features without achieving all aspects, advantages, or novel features as may be taught or suggested.

In view of the foregoing disadvantages inherent in the known art, the present invention provides a novel blower fan assembly. The general purpose of the present invention, which will be described subsequently in greater detail, is to provide a blower fan assembly that keeps golfers cool and is relatively easy to install and uninstall on a golf cart. The features of the invention which are believed to be novel are particularly pointed out and distinctly claimed in the concluding portion of the specification. These and other features, aspects, and advantages of the present invention will become better understood with reference to the following drawings and detailed description.

In one embodiment, the present invention may provide for a blower fan assembly configured to removably attach to a golf cart. The present invention may provide for a twelve-volt ("12 v") portable golf cart squirrel cage blower fan assembly that is configured as an easily set-up system. It is designed to keep players cooled off. It comes with a portable 12v rechargeable power supply battery, a protection case and a carrying travel bag, for both the battery and blower fan. The protection case has a sight glass to view battery power life lights, two cigarette lighter ports for the blower fan and a plug in adapter for phones, ipads, and golf gps's.

The present invention may also provide that a ball joint mount is located on the blower fan is that allows for rotation and placement of the fan in any angle needed. The rubber padded C clamps are universal and fit on to any golf cart. The device is universal for driver and passenger sides. The present invention is able to detach from the clamps at the mounting bracket. The strap allows users to roll and tie up the blower's power cord for storage when not in use.

To use the device, a user may simply place the portable battery in the front compartment of any golf cart, clamp the blower fan on the front support bar in front of the user, run the power cord down and around the support bar leading down to the battery, plug the power cords male cigarette lighter plug into the female cigarette lighter port on the battery, angle the fan at a comfortable level, flip on the power switch and enjoy cool air. The power switch has a 3 speed option, for low, medium and high levels.

The present invention, in some embodiments, may provide for the following specifications, which are provided as illustrations and not by way of limitation: the battery dimensions may be (width/depth/thickness) 7½"×5½"×2½"; the battery power may be rechargeable at 12 v 22 ah (amp hour); the blower fan size may be approximately 5"×6" squared; the blower fan power may be a 5 amp blower fan providing an approximate 160 cubic air flow per minute ("cfm"); there may be a 5.5 or 6 amp fuse inside the male cigarette lighter plug on the end of the blower fan cord; the blower fan cord may be eight feet long with the power switch two feet down the cord from the fan; and the C clamps on the mounting bracket may be 2-2½" for the clamps openings.

The unique features of the present invention may provide the following benefits for one or more consumers: it may provide portable cool air circulation; it may be easy to hook up and take apart; it may prevent heat related illness; and it may make golfing on hot days more enjoyable.

BRIEF DESCRIPTION OF THE DRAWINGS

These and other features, aspects and advantages of the present invention will become better understood with regard to the following description, appended claims, and accompanying figures where:

DETAILED DESCRIPTION

The present invention overcomes the limitations of the prior art by providing a new and more effective blower fan assembly.

All dimensions specified in this disclosure are by way of example only and are not intended to be limiting. Further, the proportions shown in these Figures are not necessarily to scale. As will be understood by those with skill in the art with reference to this disclosure, the actual dimensions and proportions of any embodiment or element of an embodiment disclosed in this disclosure will be determined by its intended use.

It is to be understood that the drawings and the associated descriptions are provided to illustrate potential embodiments of the invention and not to limit the scope of the invention. Reference in the specification to "one embodiment" or "an embodiment" is intended to indicate that a particular feature, structure, or characteristic described in connection with the embodiment is included in at least an embodiment of the invention. The appearances of the phrase "in one embodiment" or "an embodiment" in various places in the specification are not necessarily all referring to the same embodiment.

Throughout the drawings, reference numbers are re-used to indicate correspondence between referenced elements. In addition, the first digit of each reference number indicates the figure where the element first appears.

As used in this disclosure, except where the context requires otherwise, the term "comprise" and variations of the term, such as "comprising", "comprises" and "comprised" are not intended to exclude other additives, components, integers or steps.

In the following description, specific details are given to provide a thorough understanding of the embodiments. However, it will be understood by one of ordinary skill in the art that the embodiments may be practiced without these specific detail. Well known features, elements or techniques may not be shown in detail in order not to obscure the embodiments.

Figure 1:
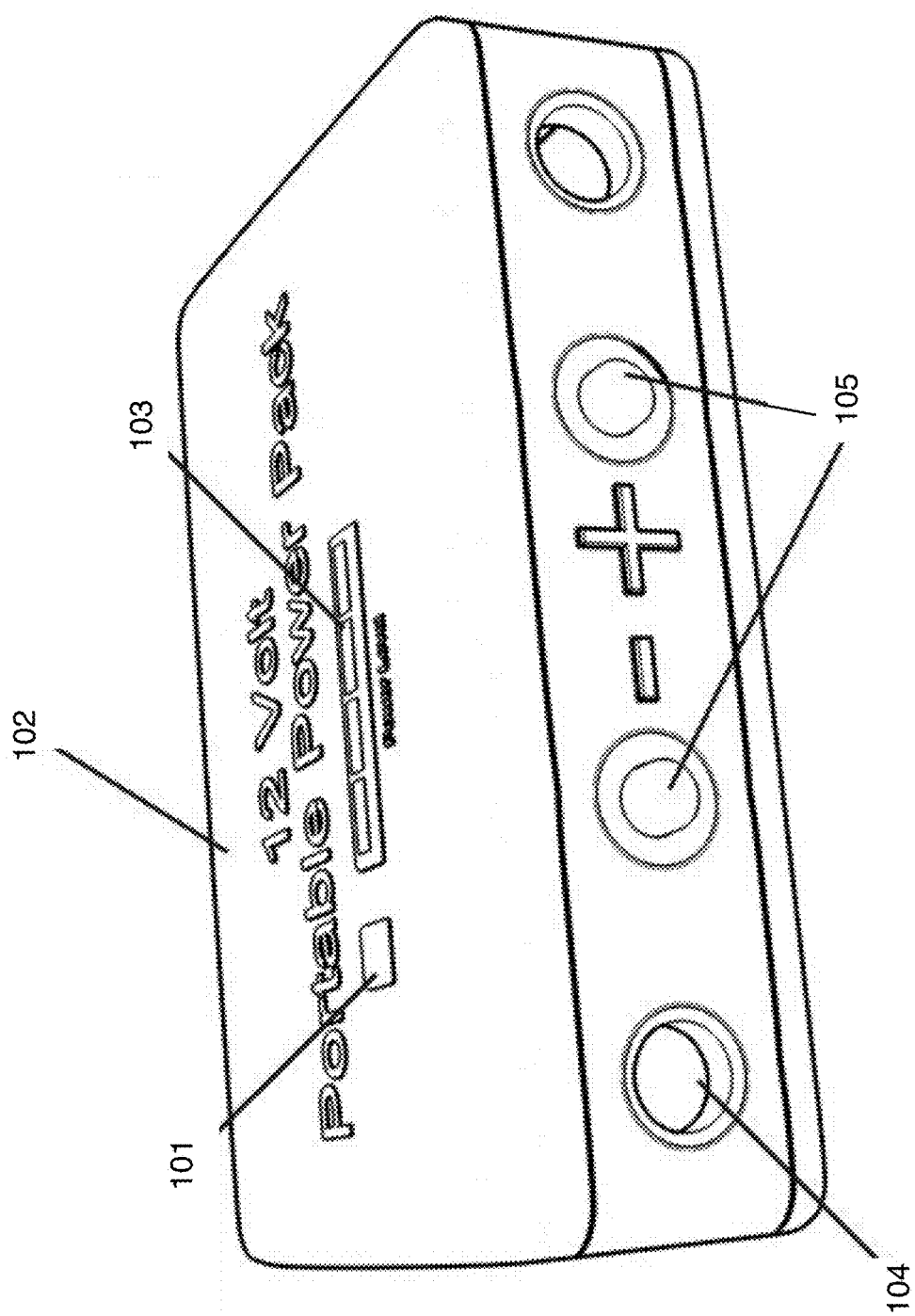
FIG. 1 shows a top perspective view of a blower fan assembly in accordance with one embodiment of the invention.

Turning attention to FIG. 1, a top perspective view of a blower fan assembly in accordance with one embodiment of the invention is shown. In the embodiment depicted, a viewer may perceive power meter/lights power button 101, power battery system 102, power meter 103, cigarette lighter style plugs 104, and battery terminals 105. In some embodiments, the present invention may provide for a positive and a negative battery terminal 105.

Figure 2:
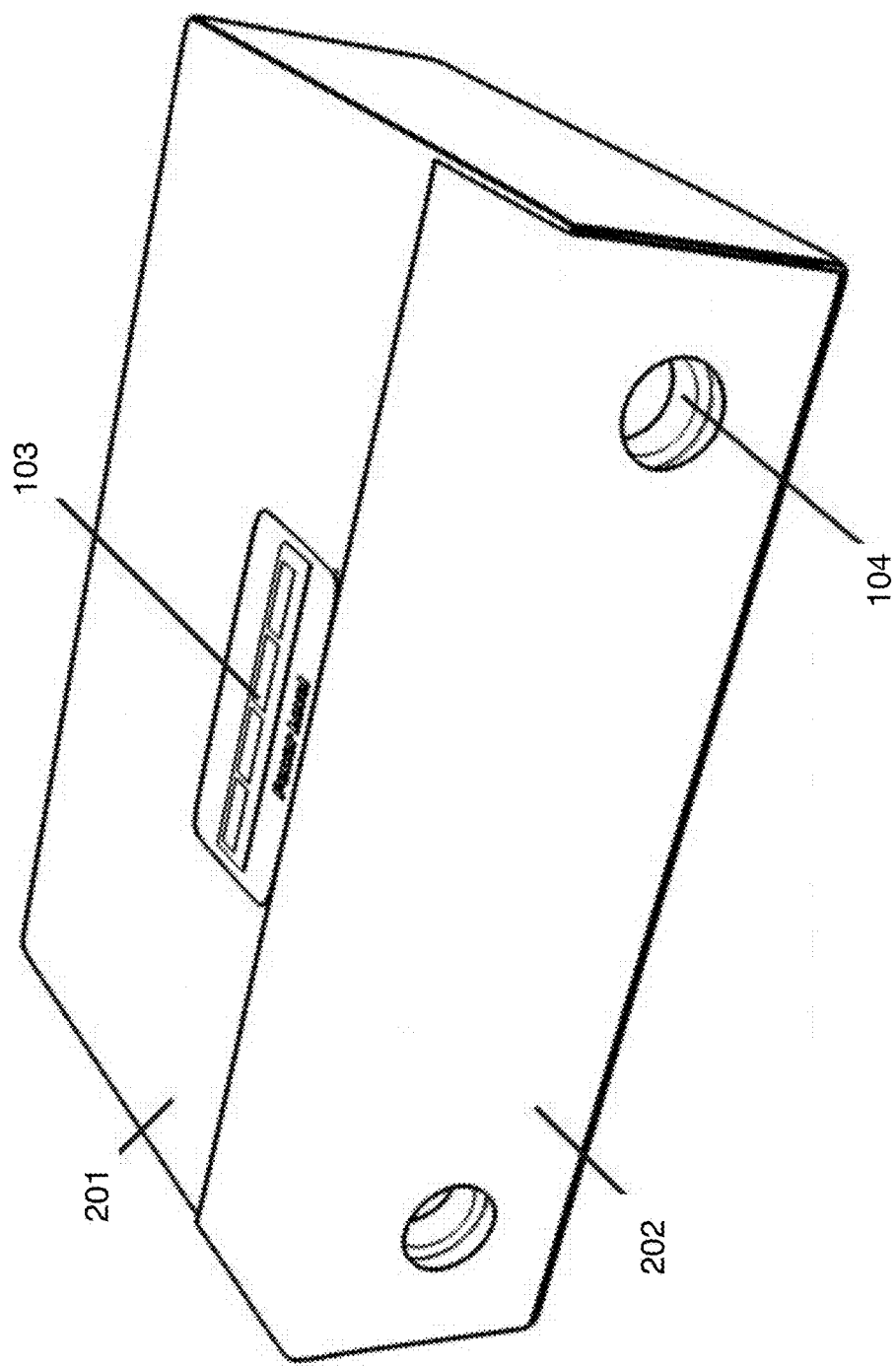
FIG. 2 shows a rear perspective view of a blower fan assembly in accordance with one embodiment of the invention.

With respect to FIG. 2, a rear perspective view of a blower fan assembly in accordance with one embodiment of the invention is shown. In the embodiment depicted, a viewer may perceive protective case 201 and hook and loop flap 202, as well as power meter 103 and cigarette lighter style plugs 104.

Figure 3:
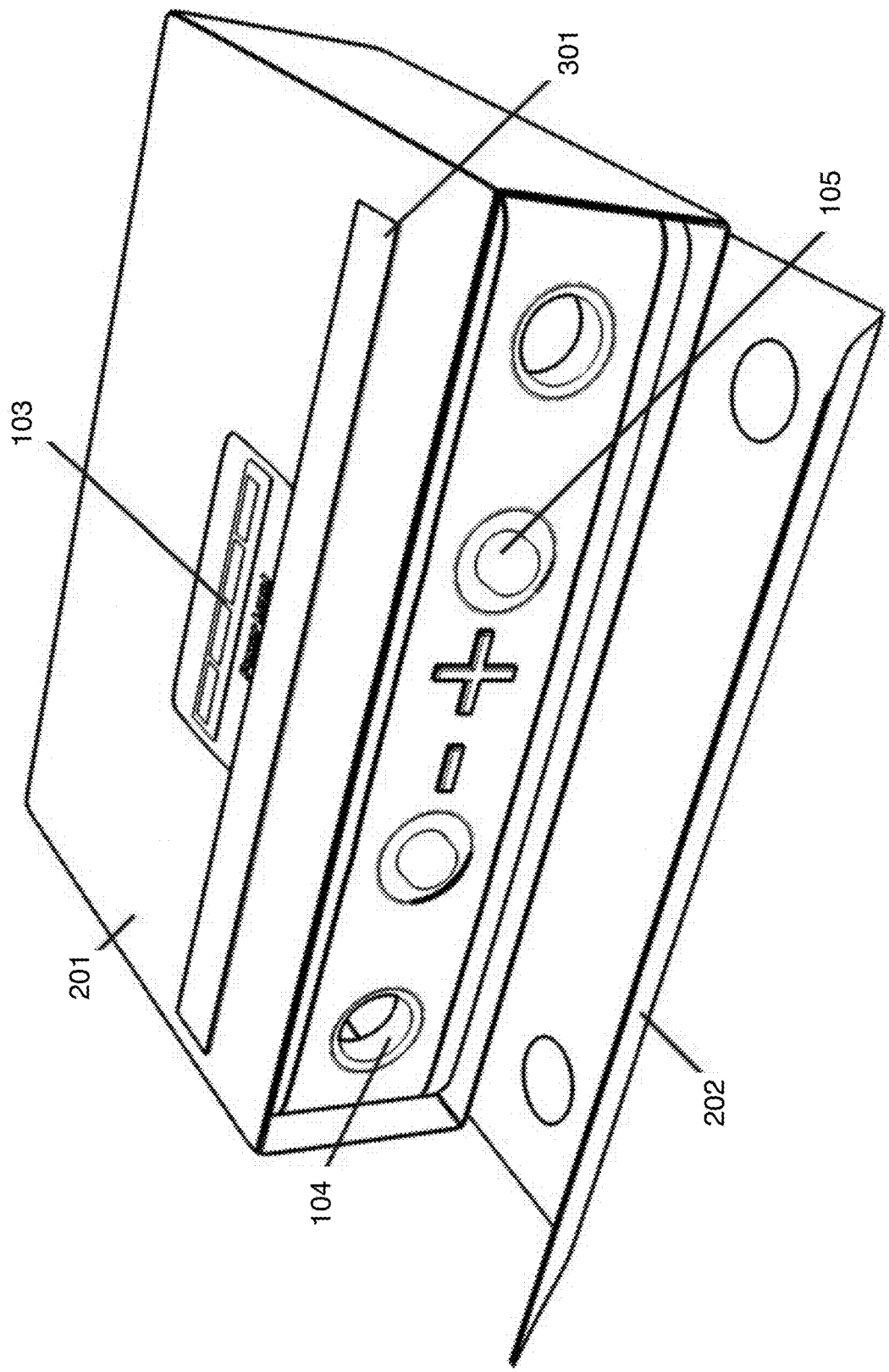
FIG. 3 shows a rear perspective view of a blower fan assembly in accordance with one embodiment of the invention.

Turning attention to FIG. 3, a rear perspective view of a blower fan assembly in accordance with one embodiment of the invention is shown. In the embodiment depicted, a viewer may perceive hook and loop element 301, as well as protective case 201, hook and loop flap 202, power meter 103, cigarette lighter style plugs 104, and battery terminals 105. In some embodiments, the present invention may provide for a positive and a negative battery terminal 105.

Figure 4:
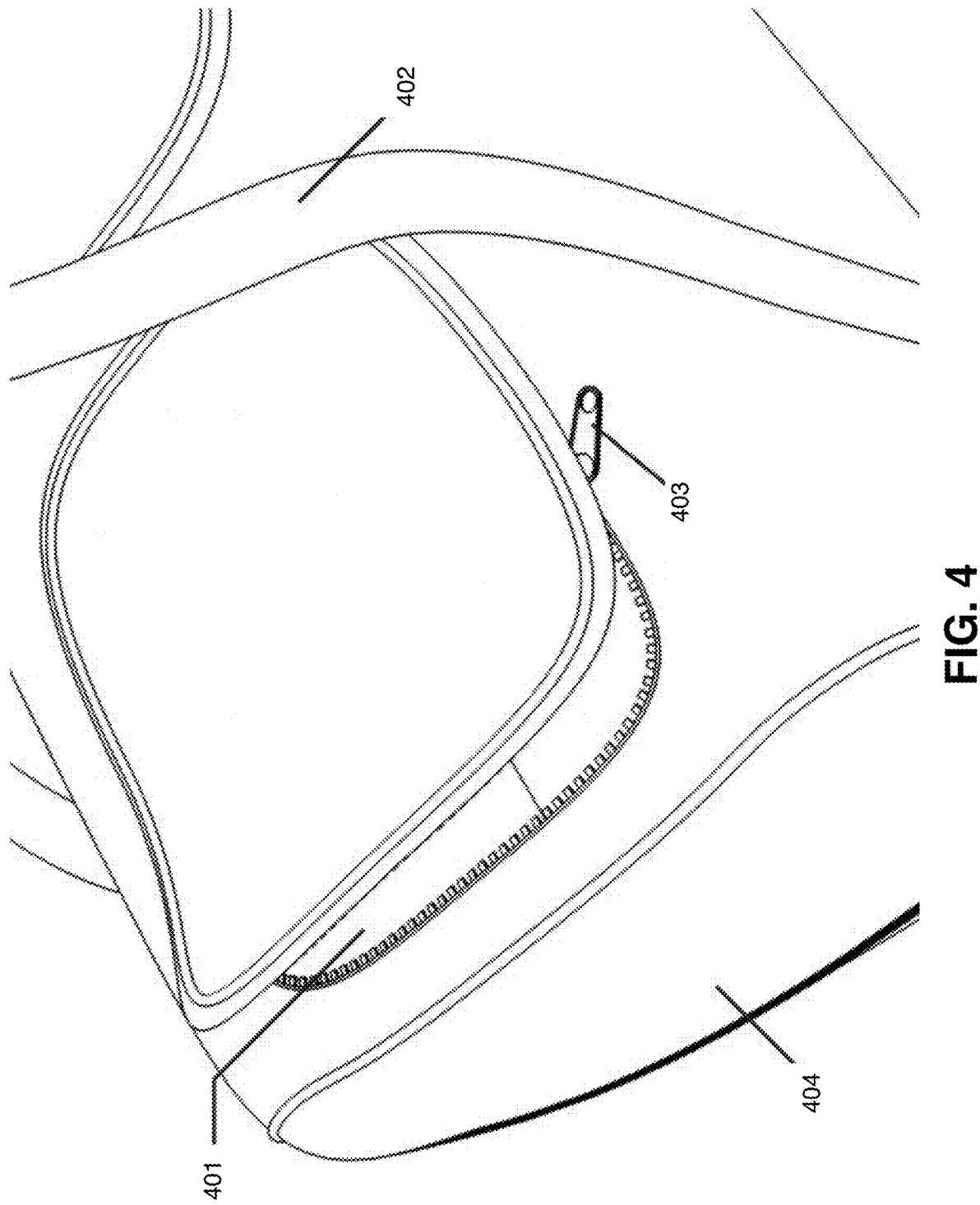
FIG. 4 shows a top perspective view of an element of a blower fan assembly in accordance with one embodiment of the invention.

With respect to FIG. 4, a top perspective view of an element of a blower fan assembly in accordance with one embodiment of the invention is shown. In the embodiment depicted, a viewer may perceive pockets for fan and battery 401, bag strap 402, zipper 403, and small carrying case 404.

Figure 5:
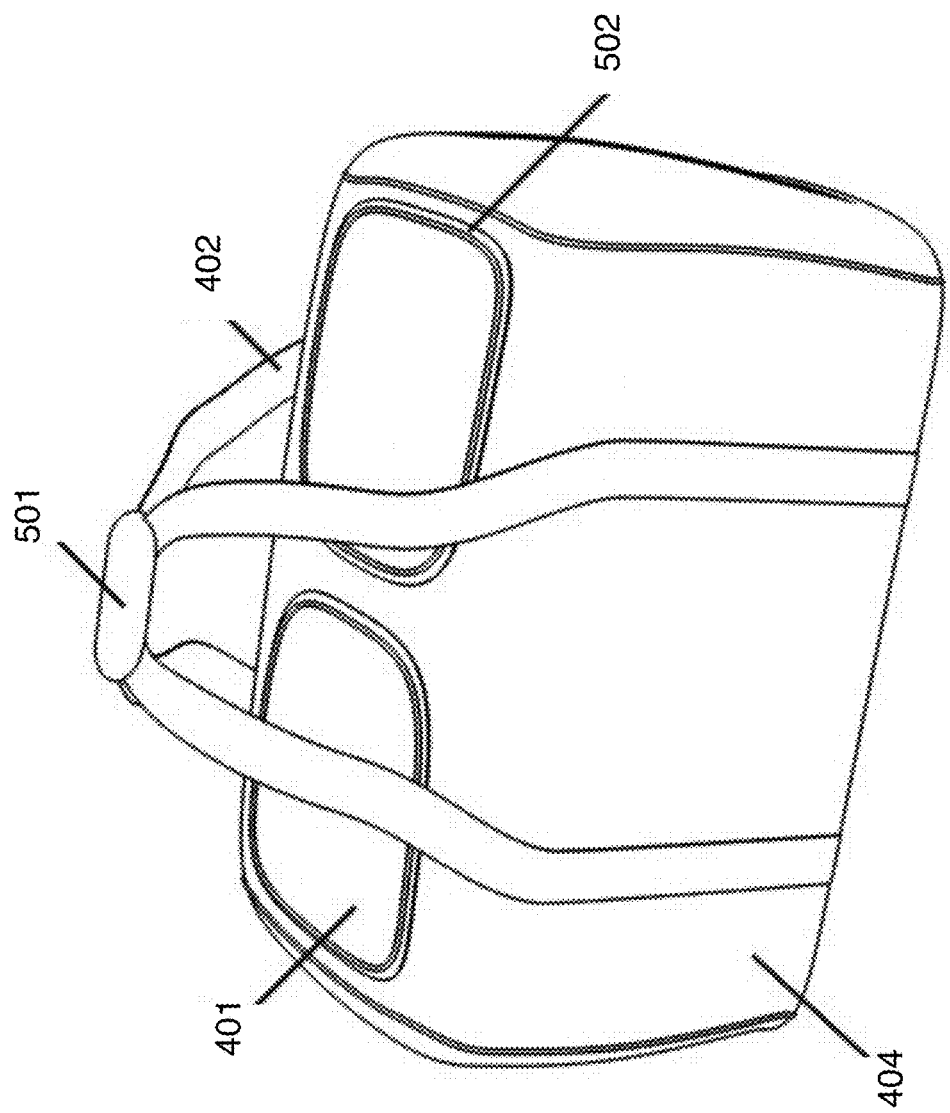
FIG. 5 shows a top perspective view of an element of a blower fan assembly in accordance with one embodiment of the invention.

With respect to FIG. 5, a top perspective view of an element of a blower fan assembly in accordance with one embodiment of the invention is shown. In the embodiment depicted, a viewer may perceive bag handle 501 and zipper in the shut position 502, as well as pockets for fan and battery 401, bag strap 402, and small carrying case 404.

Figure 6:
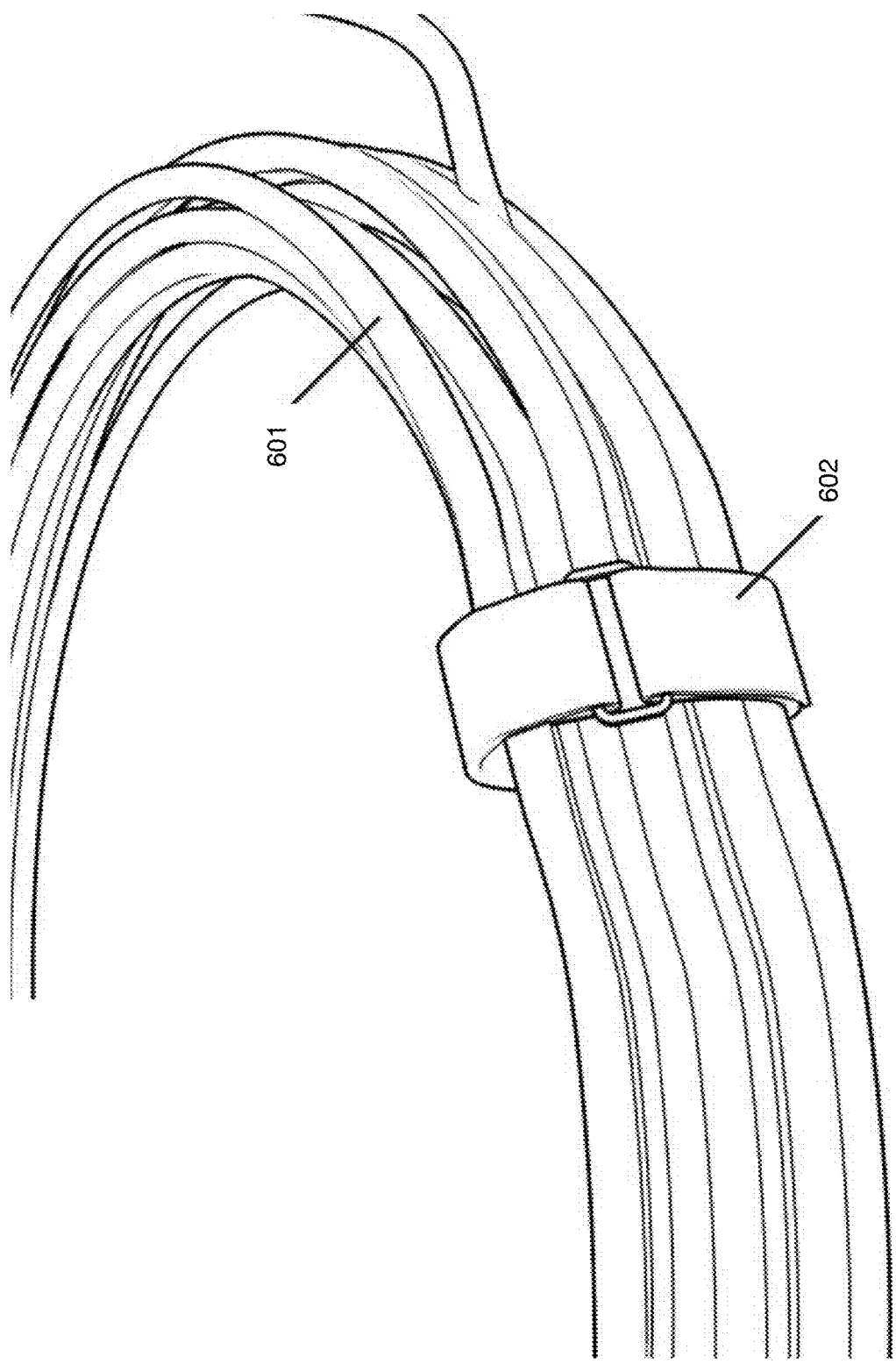
FIG. 6 shows a top perspective view of an element of a blower fan assembly in accordance with one embodiment of the invention.

Turning attention to FIG. 6, a top perspective view of an element of a blower fan assembly in accordance with one embodiment of the invention is shown. In the embodiment depicted, a viewer may perceive power chord rolled up for storage 601 and hook and loop cinch strap 602.

Figure 7:
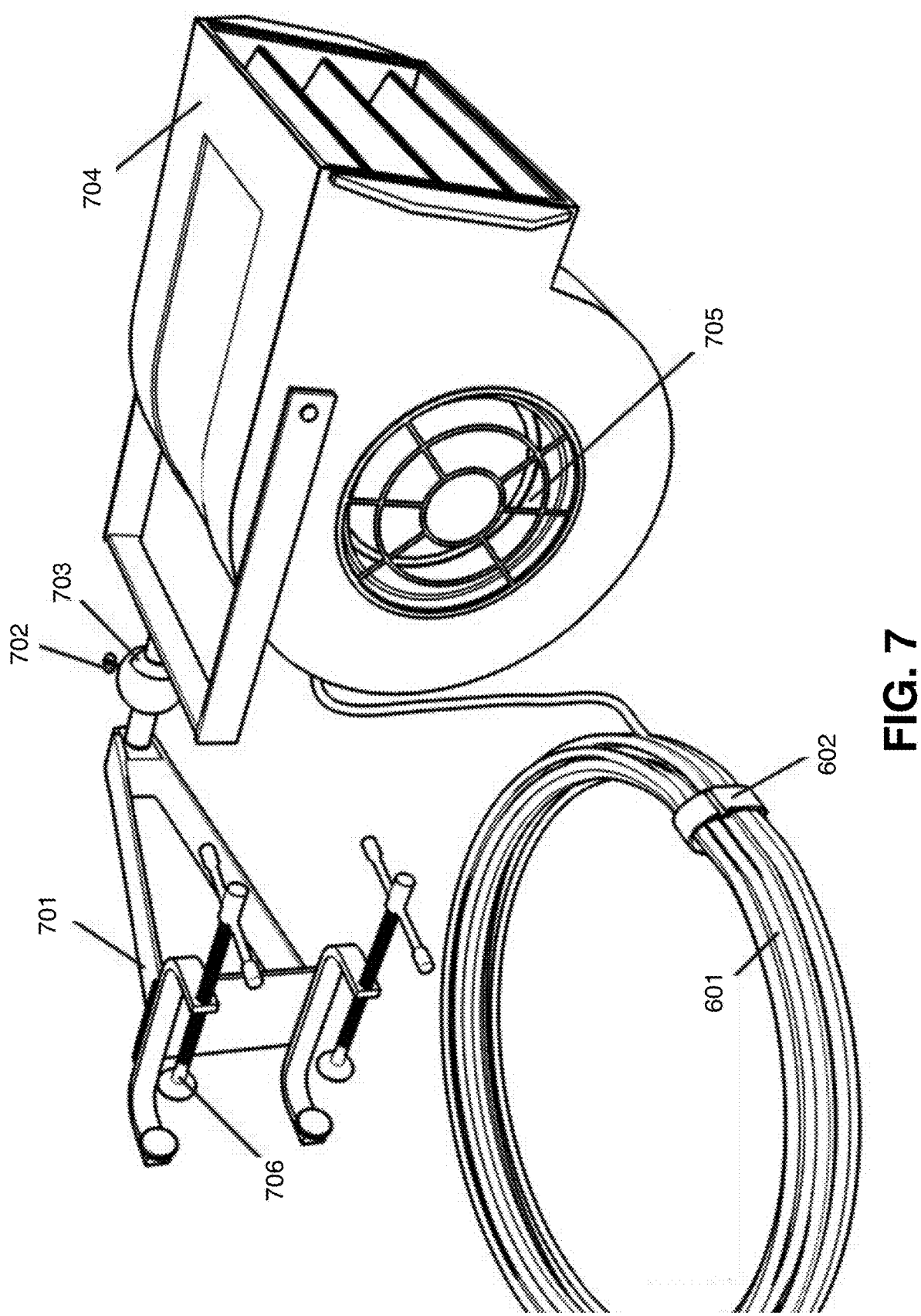
FIG. 7 shows a top perspective view of a blower fan assembly in accordance with one embodiment of the invention.

With respect to FIG. 7, a top perspective view of a blower fan assembly in accordance with one embodiment of the invention is depicted. In the embodiment shown, a viewer may perceive wall joint connection 701, wing nut tightening ball joint 702, ball mount joint 703, blower fan 704, air vent 705, and rubber padded c clamp 706 as well as power chord rolled up for storage 601 and hook and loop cinch strap 602.

Figure 8:
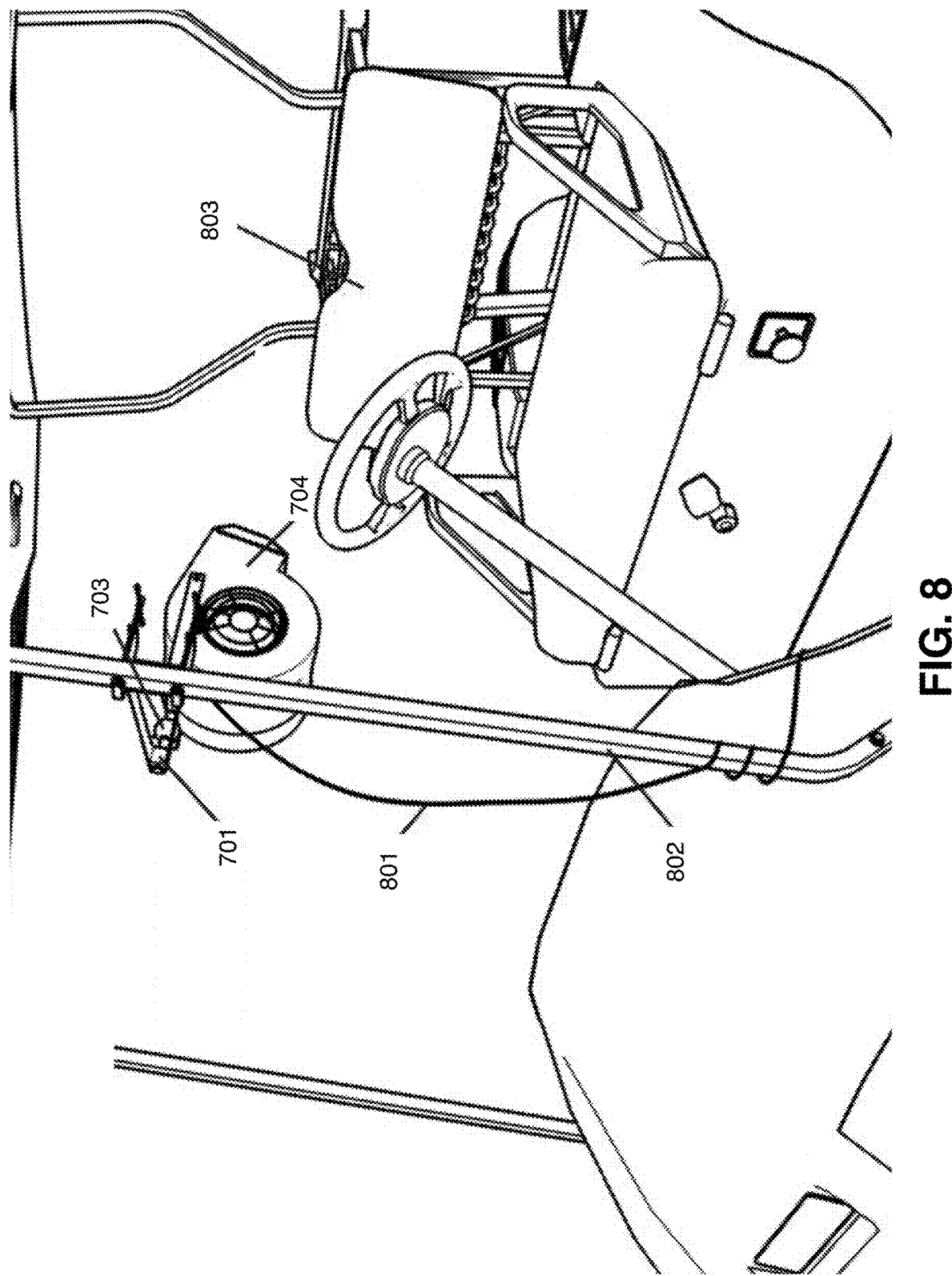
FIG. 8 shows a front perspective view of a blower fan assembly in accordance with one embodiment of the invention.

Turning attention to FIG. 8, a front perspective view of a blower fan assembly in accordance with one embodiment of the invention is shown. In the embodiment depicted, a viewer may perceive power chord 801, roof support bar 802, and golf cart 803, as well as wall joint connection 701, ball mount joint 703, and blower fan 704.

Figure 9:
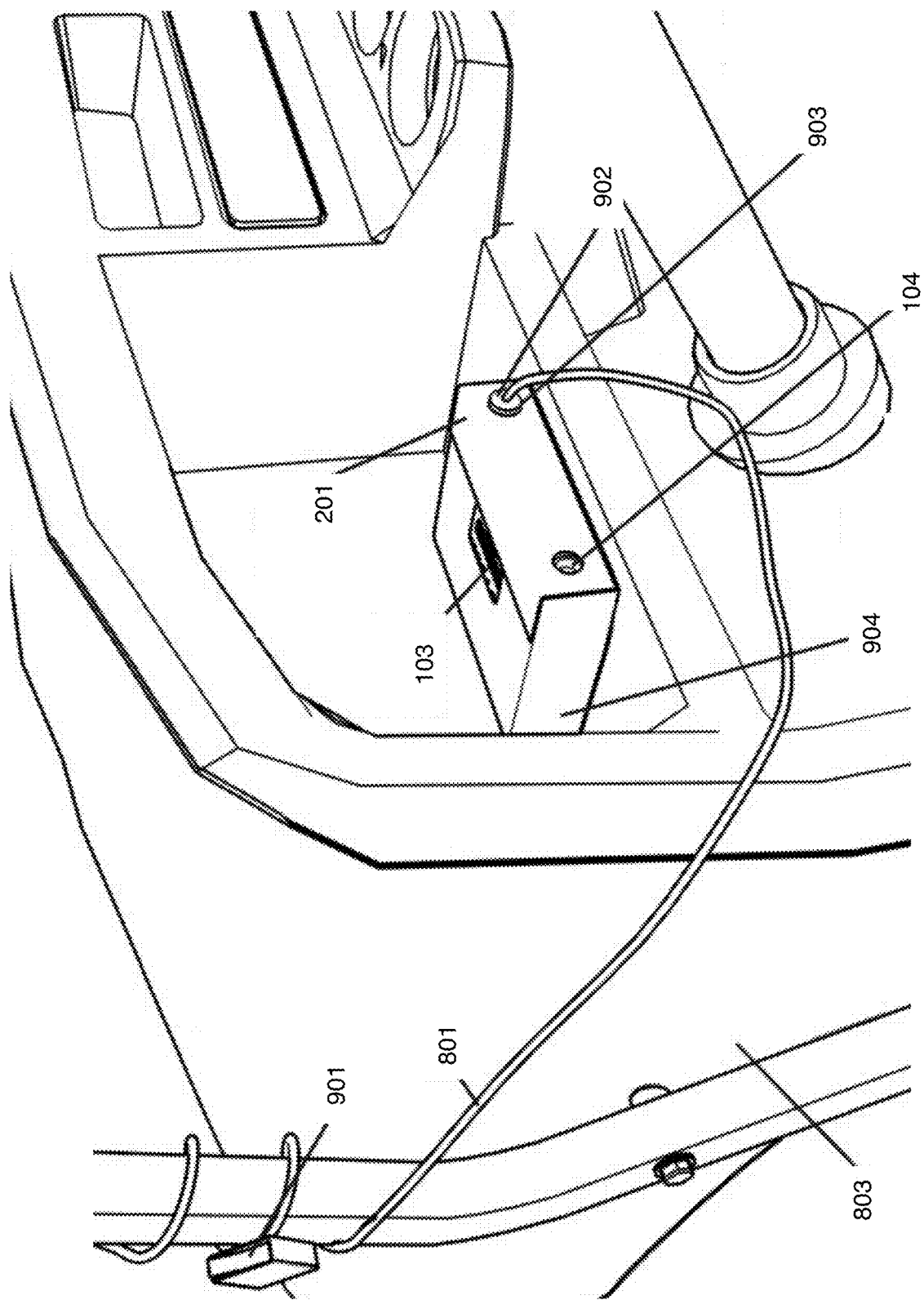
FIG. 9 shows a top perspective view of a blower fan assembly in accordance with one embodiment of the invention.

With respect to FIG. 9, a top perspective view of a blower fan assembly in accordance with one embodiment of the invention is depicted. In the embodiment shown, a viewer may perceive power switch 901, male cigarette lighter plug 902, female cigarette lighter plug 903, and portable battery pack 904, as well as power chord 801, golf cart 803, power meter 103 and cigarette lighter style plugs 104.

Figure 10:
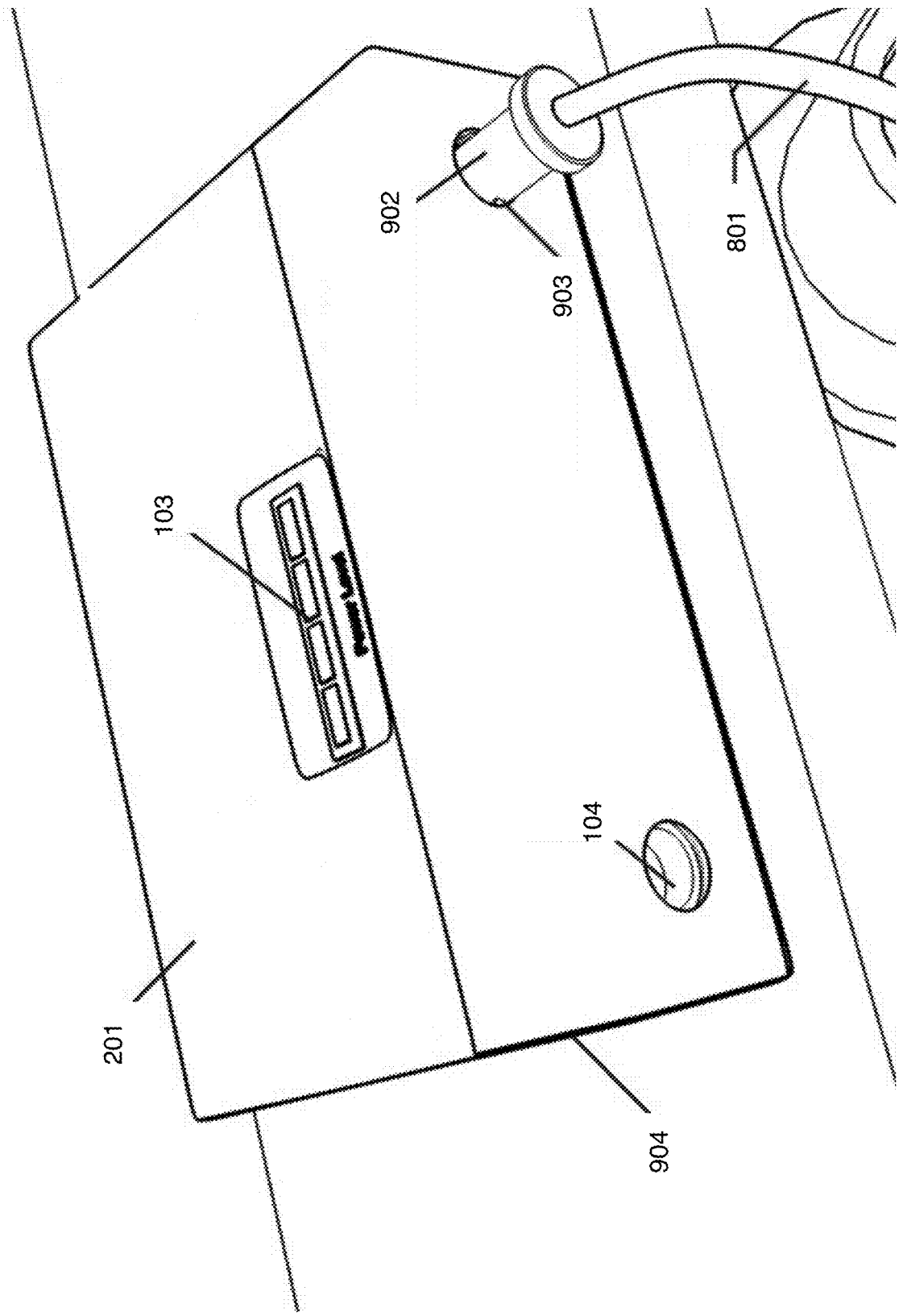
FIG. 10 shows a top perspective view of a blower fan assembly in accordance with one embodiment of the invention.

Finally, with respect to FIG. 10, a top perspective view of a blower fan assembly in accordance with one embodiment of the invention is shown. In the embodiment depicted, a viewer may perceive power meter 103, cigarette lighter style plugs 104, protective case 201, power chord 801, male cigarette lighter plug 902, and female cigarette lighter plug 903.

CONCLUSIONS, RAMIFICATIONS, AND SCOPE

Although the present invention has been described with a degree of particularity, it is understood that the present disclosure has been made by way of example and that other versions are possible. As various changes could be made in the above description without departing from the scope of the invention, it is intended that all matter contained in the above description or shown in the accompanying drawings shall be illustrative and not used in a limiting sense. The spirit and scope of the appended claims should not be limited to the description of the preferred versions contained in this disclosure.

All features disclosed in the specification, including the claims, abstracts, and drawings, and all the steps in any method or process disclosed, may be combined in any combination, except combinations where at least some of such features and/or steps are mutually exclusive. Each feature disclosed in the specification, including the claims, abstract, and drawings, can be replaced by alternative features serving the same, equivalent or similar purpose, unless expressly stated otherwise. Thus, unless expressly stated otherwise, each feature disclosed is one example only of a generic series of equivalent or similar features.

Any element in a claim that does not explicitly state "means" for performing a specified function or "step" for performing a specified function should not be interpreted as a "means" or "step" clause as specified in 35 U.S.C. § 112.

While the blower fan assembly configured to removably attach to a golf cart generally described herein has been disclosed in connection with a number of embodiments shown and described in detail, various modifications should be readily apparent to those of skill in the art.

What is claimed is:

1. A fan assembly, comprising:
   a fan having at least one female cigarette lighter electrical plug;
   a ball mount joint fixedly connected to the fan and allowing for rotation and placement of the fan at a desired angle;
   a wing nut tightening ball joint fixedly connected to the ball mount joint;
   a wall joint connection fixedly connected to the ball mount joint through the wing nut tightening ball joint;
   a mounting bracket having at least one c clamp fixedly connected to the wall joint connection;
   a portable battery pack, wherein the battery pack comprises a battery, a positive battery terminal, a negative battery terminal, a power meter display, and at least one female cigarette lighter electrical plug and a protective case configured to retain the battery and having a hinged cover having at least one opening, each said opening being associated with a corresponding said at least one female cigarette lighter electrical plug;
   a power chord electrically coupled with the fan and the battery pack, wherein the power chord is configured to have two ends, wherein a first power chord end is configured to mate with one of said at least one female cigarette lighter electrical plugs of said battery pack and a second power chord end is configured to plug into one of said at least one female cigarette lighter electrical plug on the fan; and
   a power switch electrically coupled with the power chord and wherein the fan assembly is portable and includes a carrying case configured to retain the fan and portable battery pack.

2. The fan assembly of claim 1, wherein the fan is a blower fan.

3. The fan assembly of claim 1, wherein the battery pack has a twelve volt battery.

4. The fan assembly of claim 1, wherein the at least one c clamp is an elastomeric padded c clamp.

5. The fan assembly of claim 1, wherein the small carrying case has at least one pocket configured to removably retain the battery pack and at least one pocket configured to removably retain the fan.

6. The fan assembly of claim 1, wherein the protective case includes a sight glass to view the power meter display.

7. The fan assembly of claim 1, wherein the power chord is rolled and tied up by a hook and loop cinch strap and stored when not in use.

8. A method of connecting a fan assembly to a golf cart, the method comprising the following steps:
   providing a golf cart;
   providing a fan having at least one female cigarette lighter electrical plug;
   providing a ball mount joint fixedly connected to the fan;
   providing a wing nut tightening ball joint fixedly connected to the ball mount joint;
   providing a wall joint connection fixedly connected to the ball mount joint through the wing nut tightening ball joint;
   providing a mounting bracket having at least one c clamp fixedly connected to the wall joint connection;
   providing portable a battery pack, wherein the battery pack comprises a battery, a positive battery terminal, a negative battery terminal, a power meter display, and at least one female cigarette lighter electrical plug and a protective case configured to retain the battery and having a hinged cover having at least one opening, each said opening being associated with a corresponding said at least one female cigarette lighter electrical plug;
   providing a power chord electrically coupled with the fan and the battery pack, wherein the power chord is configured to have two ends, wherein a first power chord end is configured to mate with one of said at least one female cigarette lighter electrical plugs of said battery pack and a second power chord end is configured to plug into one of said at least one female cigarette lighter electrical plug on the fan;

providing a carrying case configured to retain the fan and the portable battery pack of make the fan assembly portable;

providing a power switch electrically coupled with the power chord;

securing the c clamps to a portion of the golf cart;

connecting the battery pack to the fan;

powering on the battery pack; and turning on the fan.

9. The method of claim 8, wherein the fan is a blower fan.

\* \* \* \* \*